Aug. 6, 1963 R. G. TAYLOR, JR 3,099,877
HINGED CASING PROTECTOR TRANSFER SLEEVE
Original Filed Feb. 1, 1957 2 Sheets-Sheet 1

INVENTOR.
RAYMOND G. TAYLOR, JR.
BY
Allen E. Hambley
ATTORNEY.

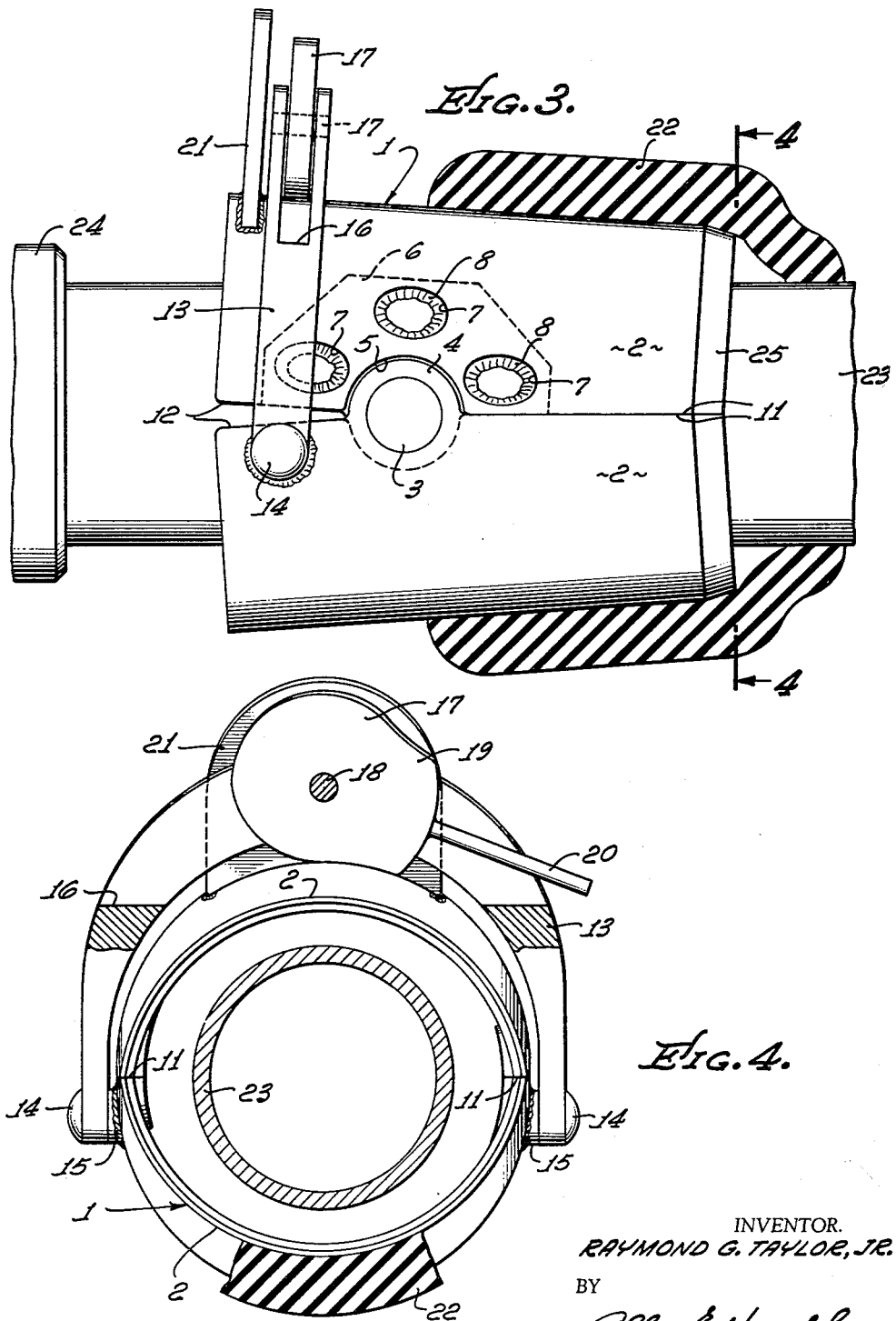

United States Patent Office 3,099,877
Patented Aug. 6, 1963

3,099,877
HINGED CASING PROTECTOR TRANSFER
SLEEVE
Raymond G. Taylor, Jr., Santa Monica, Calif., assignor to
Borg-Warner Corporation, Chicago, Ill., a corporation
of Illinois
Original application Feb. 1, 1957, Ser. No. 637,817, now
Patent No. 2,957,233, dated Oct. 25, 1960. Divided
and this application Dec. 18, 1959, Ser. No. 860,569
4 Claims. (Cl. 29—236)

This application is a division of my application Ser. No. 637,817, filed February 1, 1957, now Patent No. 2,957,233, granted October 25, 1960.

The present invention relates to a transfer sleeve for casing protectors and more particularly to a transfer sleeve of an improved structure which facilitates the application of the casing protectors to a casing from the transfer sleeve.

In the art of rotary well drilling, it has become common practice to provide a rubber of rubber-like protector collar at intervals on the drill pipe or casing in order to reduce wear of the drill pipe or casing and the connections thereof which are known as tool joints or couplings. The protector collars are usually composed of natural or synthetic rubber or rubber compound. These protectors are ordinarily of annular form and encircle the pipe to be protected.

In order that the protector collars may tightly grip the pipe or casing to thereby prevent slippage, they are initially formed with an internal diameter substantially smaller than the external diameter of the casing or pipe to which they are adapted to be applied. Accordingly, it is necessary that the protectors be expanded substantially for application to the casing, it being necessary that the protectors be expanded so that they may be passed over the enlarged tool joints or couplings of the pipe or casing.

Casing protectors, as they have now developed in the art, are provided in a range of sizes to fit the various sizes of drill pipes commonly employed, and when such protectors are to be stretched upon a casing or pipe, a protector is selected which has a relaxed size such that it must be stretched approximately 100% so as to fit upon the casing or pipe. Depending upon the diameter of the casing or pipe, the thickness of the protectors from their inside to their outside diameters may range from ¾" upwards to 2" or more. Thus, to sufficiently stretch a protector having a relaxed diameter on the order of 2½" to a condition where the protector has a diameter on the order of approximately 5" and beyond requires a great deal of force.

It has become somewhat standard practice to employ a special power-operated tool for stretching rubber or similar casing protectors or collars onto a cylindrical transfer sleeve having an inside diameter greater than the diameter of the tool joints or couplings of a pipe or casing to which the protector is to be applied. The protectors are installed upon a casing or pipe by disposing the transfer sleeve thereabout and pushing the protector off of the sleeve with a suitable push-off device.

A general object of the present invention is to provide a relatively simple and efficient transfer sleeve which facilitates the installation of casing protectors on the pipe or casing without necessitating the employment of special push-off tools as aforesaid.

Another object in accordance with the aforesaid general objective, is to provide a transfer sleeve which is adapted to assume a generally cylindrical form, and to be retained in such form so as to enable the application of a casing protector thereto and the frictional retention of the protector thereon, the transfer sleeve being so constructed that it will assume a tapered form whereby the energy stored in the protector device will effect removal of the transfer sleeve from within the protector.

Another object of the invention is to provide a transfer sleeve which generally comprises a plurality, preferably a pair, of semi-cylindrical body half-sections having terminal portions hingedly interconnected in abutting relation so as to provide a generally tubular body, the half-sections being provided at one end with latch means for holding the body sections in a condition where the tubular body is cylindrical, but with the opposing terminal surfaces of the body half-sections being tapered in such a manner that when the latching means is released, a casing protector disposed about the sleeve will cause the body half-sections to swing about the hinged connection until the tapered terminal surfaces abut with one another and the sleeve is generally frusto-conical in form.

As the result of the sleeve's assuming the tapered or frusto-conical form, the stress stored up in the protector and acting upon the inclined outer periphery of the sleeve (in a manner determined by the angle of taper of the sleeve, the energy stored in the protector, and frictional resistance to movement of the protector) will exert an axial component of force which will move the sleeve out of the protector, thus enabling the protector to contract about a casing or pipe. In practice soap or other lubricant will be applied to the transfer sleeve to reduce frictional resistance and facilitate removal of the protector from the sleeve.

Other objects and advantages of the invention will be hereinafter described or will become apparent to those skilled in the art, and the novel features hereof will be defined in the appended claims.

In the accompanying drawings:

FIG. 3 is a view similar to FIG. 1, but showing the transfer sleeve in frusto-conical form with the protector partially removed from the sleeve; and FIG. 4 is a view in section, as taken on the line 4—4 of FIG. 3, with a portion of the protector broken away to better reveal the latch mechanism.

Like reference characters in the several figures of the drawings and in the following description designate corresponding parts.

Figure 1:
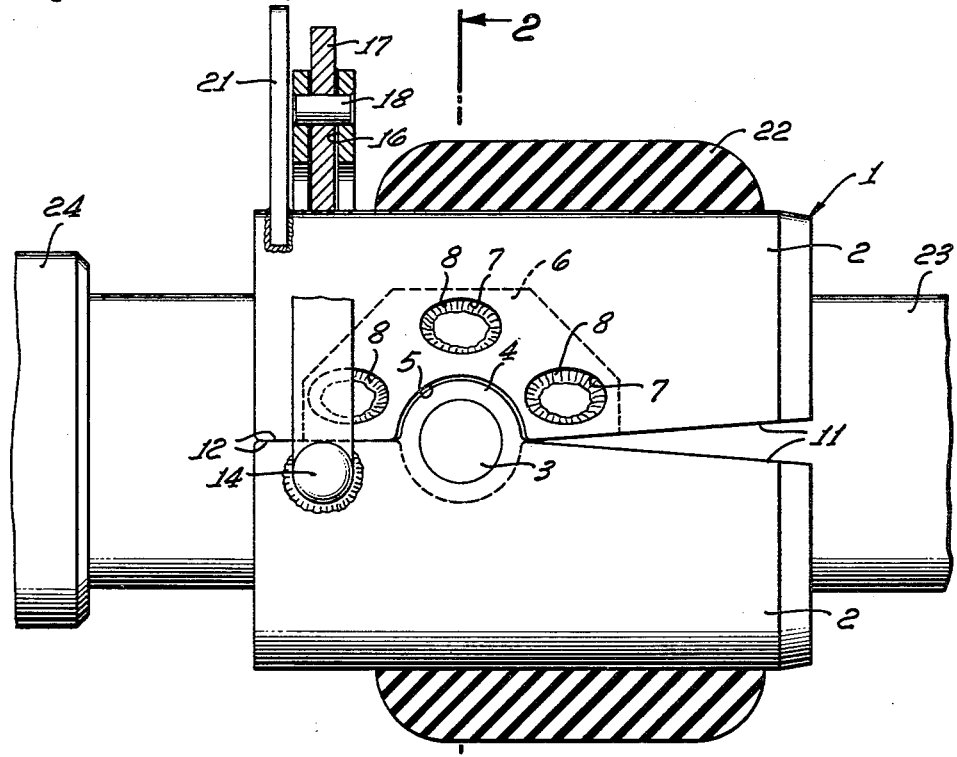
FIG. 1 is a view partly in elevation and partly in section, showing a transfer sleeve embodying the invention with a casing protector disposed thereon, and with a section of casing or pipe extending through the sleeve.
Figure 2:
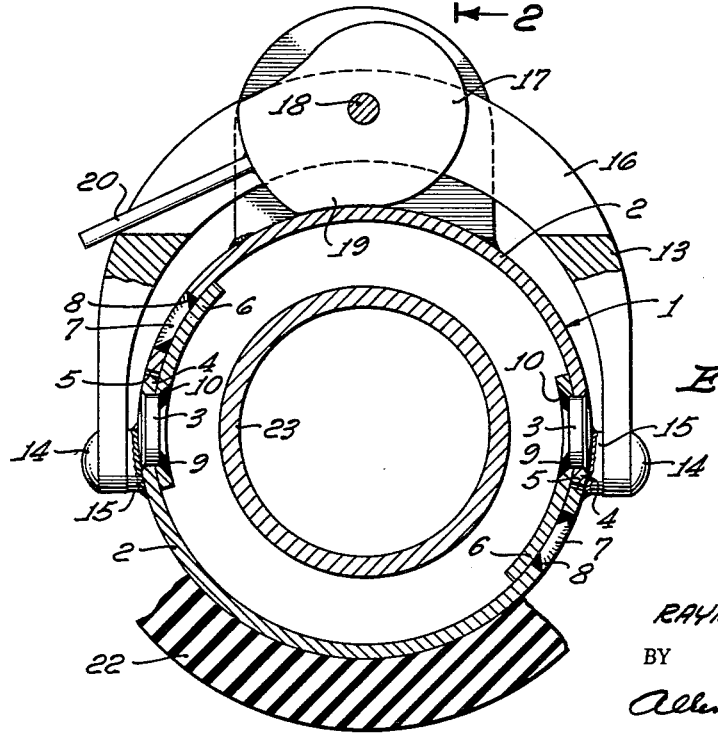
FIG. 2 is a view in section, as taken on the line 2—2 of FIG. 1, with a portion of the protector broken away to better reveal the latch construction.

Referring particularly to FIGS. 1 and 2, 1 generally denotes a transfer sleeve embodying the invention. The sleeve 1 is composed of a plurality of similar body sections 2. Preferably the body is composed of a pair of such sections 2, although any desired number may be employed. In the illustrative form, the 2 half-sections are shown as having adjacent marginal or terminal portions abutting on a diametrical plane extended axially of the sleeve. Means are provided for hingedly interconnecting the sections 2 together on this diametrical plane. Preferably such hinge means includes a pair of diametrically opposed trunnions 3, which are respectively carried by one body section 2 and pivotally connected to the other body section 2.

In order to accommodate the trunnions 3, each body section at a point intermediate its ends is provided with a circumferentially projecting ear 4 having an arcuate outer periphery. In addition, each body section 2 is also provided with an arcuate depression 5 into which the ears 4 project when the half-sections are disposed in assembled relation. Thus, the body sections 2 are identical in form which facilitates their manufacture.

Secured to the inside wall of each of the body sections 2 is a trunnion supporting plate 6, each plate 6 being arcuate so as to closely fit the body section 2 by which it is carried. The plates 6 may be secured to the body sections 2 in any suitable manner, but preferably this is accomplished by providing a number of holes 7 through the body sections 2 in overlying relation to the plate 6 and applying a bead of welding 8 in the holes 7 to the surface of the plates 6.

The ears 4 provide terminal portions overlapping the plates 6 and the trunnions 3 are preferably secured to the respective supporting plates 6 as by welding at 9 within an opening 10 formed in the respective plates 6. The trunnions 3 project through an opening in the respective plates 6 and are preferably bezeled at their outer extremities for interlocking the trunnions to the body sections 2, while allowing free pivotal movement of the body sections about the trunnions.

The opposing edge faces 11 of the adjacent terminal portions of the body sections 2, extending in one direction from the hinged connection of the body sections to the extreme end of the sleeve, are angularly disposed or tapered so that the opposing faces diverge towards said end, thus enabling movement of the body sections 2 about the trunnions 3 so that the sleeve 1 may assume either a purely cylindrical form as shown in FIG. 1, or alternatively may assume a tapered or frusto-conical form as seen in the FIG. 3, the taper of the body of the sleeve being determined by the angle of the faces 11.

In order to retain the body sections 2 in the positions shown in FIG. 1 with the sleeve 1 in a cylindrical form, means are preferably provided for latching or retaining the body sections 2 in such positions, with the opposing edge faces 12 of the body sections 2 disposed in abutting contact, these faces extending axially in the opposite direction from the trunnions 3 as compared with the previously described faces 11. Such latch means preferably comprises a generally U-shaped yoke 13 which is pivotally connected at its ends as by means of pivot pins 14 to one of the body sections 2, the pivot pins 14 being suitably supported in supporting elements 15 which are welded or otherwise suitably secured to the just-mentioned body section 2.

The yoke 13 is preferably slotted as at 16 so as to receive a rotatable cam 17 which is mounted in the slot 16 for pivotal movements upon a rivet 18 or the like. The periphery of the cam 17 is eccentric with relation to the axis of rotation of the cam so that when the cam is in the position shown in FIG. 2, the cam will act upon the adjacent body sections 2 of the sleeve 1, and upon the yoke 13 to hold the faces 12 of the body sections 2 in engagement with the sleeve in a cylindrical form.

The cam 17 preferably is provided with a holding section 19 on a curve having a radius corresponding to the radius of the outside surface of the cylindrical sleeve. At the center of the holding section 19 is a suitable operating arm or member 20 welded or otherwise secured to the cam 17. A radially projecting guard plate 21 may be welded or otherwise secured to the outer periphery of the sleeve 1 so as to overlay the cam 17 and assist in maintaining the yoke 13 in an operative position.

In practice, with the sleeve 1 in a cylindrical form as shown in FIG. 1, a rubber or rubber-like casing protector 22 will be applied to the sleeve 1, in a manner which is well known in the art, as by the use of a conventional machine. When the protector is being expanded for application to the sleeve, it will be stretched upwards to approximately three times its normal diameter since the transfer sleeve 1 must be of such size as to not only encircle a drill pipe, as shown at 23, at its normal diameter; but the transfer sleeve 1 must also be of such a size as to pass over a tool joint or coupling on the casing or pipe 23 as is illustrated at 24.

Accordingly, substantial energy is stored in the casing protector 22, tending to rock the body sections 2 of the transfer sleeve about the trunnions 3. Upon rotation of the cam 17 from the position shown in FIGS. 1 and 2 to that shown in FIGS. 3 and 4, the body sections 2 of the transfer sleeve 1 will be permitted to swing about the trunnions 3 to the positions shown in FIGS. 3 and 4 with the edge faces 11 contacting one another and with the sleeve 1 in a generally tapered or frusto-conical form. When the sleeve 1 assumes such a form, an axial component of force will be produced by the hoop stress in the protector 22 so that the protector 22 will force the sleeve 1 axially therefrom. In order to reduce frictional resistance to this action, a lubricant or soapy material is employed between the protector 22 and the outer surface of the sleeve 1. During such removal of the sleeve from the protector 22, the protector will initially contact and frictionally engage the casing or pipe as shown in FIG. 3, and thereafter the sleeve 1 will be rapidly pushed from the protector 22 which will fit itself snugly upon the casing or pipe 23.

Removal of the sleeve 1 from the protector 22 to some extent is dependent upon the angle of taper of the sleeve, and the greater the angle of taper, the greater the effect of the hoop stress in the collar in producing the axial force aforementioned. In order to facilitate this action, the end portion of the sleeve 1 may be bevelled as at 25, thus providing a rather sharply inclined surface against which the hoop stress in the protector 22 may act.

In the light of the foregoing, it will now be apparent that an improved transfer sleeve for casing protectors and the like has been provided by virtue of the present invention. The improved transfer sleeve hereof has all the advantages of previously-known transfer sleeves, but in addition facilitates the application of protectors to casing or pipes without requiring special tools or equipment to remove the protectors from the sleeves, since this is accomplished automatically and virtually instantaneously upon release of the retaining means which hold the sleeve in a cylindrical form.

While the specific details of two illustrative embodiments have been herein shown and described, the invention is not limited to such details alone, since changes and alterations may be resorted to without departing from the spirit thereof as defined in the appended claims.

I claim:

1. A transfer sleeve of the class described for applying resilient protectors to a casing or pipe, comprising an axially extended hollow body, said body being composed of a pair of semi-cylindrical half-sections having adjacent terminal portions, means hingedly interconnecting said terminal portions for pivotal movement of said sections on a diametrical axis across said body, whereby said body assumes a frusto-conical form upon relative pivotal movement of said sections in one direction and assumes a cylindrical form upon relative pivotal movement of said sections in the other direction, and means for releasably retaining said sections in positions with said body in a cylindrical form, said retaining means comprising a cam latch, said cam latch being operatively supported upon the terminal portion of one of said half sections for rotation on an axis extending longitudinally of said body and having an eccentric portion engageable with the terminal portion of the other half section, said cam latch also having a locking portion conforming to the last mentioned terminal portion for holding the cam latch against rotation in one direction when said half sections assume a cylindrical form as aforesaid.

2. A transfer sleeve as defined in claim 1, wherein said terminal portions of said sections have opposing edges, said opposing edges of the respective sections being abuttingly parallel at one side of said hinge means when said body is in said cylindrical form and converging from said hinge means toward one end of the sections at the other side of said hinge means.

3. A transfer sleeve as defined in claim 1, wherein said retaining means comprises a yoke connected to the opposite terminal portions of one of said body sections and extending about the other body section, said cam latch being shiftably carried by said yoke.

4. A transfer sleeve of the class described for applying resilient protectors to a casing or pipe, comprising an axially extended hollow body, said body being composed of a pair of semi-cylindrical half-sections having adjacent terminal portions, means hingedly interconnecting said terminal portions for pivotal movement of said sections on a diametrical axis across said body, whereby said body assumes a frusto-conical form upon relative pivotal movement of said sections in one direction and assumes a cylindrical form upon relative pivotal movement of said sections in the other direction, and means for releasably retaining said sections in positions with said body in a cylindrical form, said retaining means comprising a yoke having ends pivotally connected to one of said body sections on a transverse axis displaced longitudinally towards an end of said body from the diametrical axis aforesaid and a portion intermediate said ends having a slot therethrough, a latching cam element disposed in said slot, means pivotally mounting said latching cam element for rotation on an axis extending longitudinally of said body, and said cam having an eccentric portion engageable with one of said body sections to hold said body in a cylindrical form.

References Cited in the file of this patent
UNITED STATES PATENTS

| | | |
|---|---|---|
| 1,110,136 | Hundhausen | Sept. 8, 1914 |
| 1,572,740 | Mattice | Feb. 9, 1926 |
| 1,739,911 | McMurray | Dec. 17, 1929 |